United States Patent
Yang et al.

(10) Patent No.: US 12,335,755 B2
(45) Date of Patent: Jun. 17, 2025

(54) COMMUNICATION METHOD AND COMMUNICATIONS APPARATUS

(71) Applicant: HUAWEI TECHNOLOGIES CO., LTD., Guangdong (CN)

(72) Inventors: Shuigen Yang, Shanghai (CN); Xingxing Hu, Shanghai (CN); Yinghao Jin, Shanghai (CN); Feng Han, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 312 days.

(21) Appl. No.: 17/376,790

(22) Filed: Jul. 15, 2021

(65) Prior Publication Data

US 2021/0345144 A1    Nov. 4, 2021

Related U.S. Application Data

(63) Continuation of application No. PCT/CN2020/080832, filed on Mar. 24, 2020.

(30) Foreign Application Priority Data

Mar. 29, 2019  (CN) .......................... 201910252481.8

(51) Int. Cl.
*H04W 24/08* (2009.01)
*H04W 24/10* (2009.01)
*H04W 76/30* (2018.01)

(52) U.S. Cl.
CPC ........... *H04W 24/08* (2013.01); *H04W 24/10* (2013.01); *H04W 76/30* (2018.02)

(58) Field of Classification Search
CPC ...... H04W 24/08; H04W 24/10; H04W 76/30
See application file for complete search history.

(56) References Cited

U.S. PATENT DOCUMENTS

| | | | |
|---|---|---|---|
| 2012/0113837 A1 | 5/2012 | Siomina et al. | |
| 2014/0153482 A1* | 6/2014 | Schmidt | H04L 1/0003 370/328 |

(Continued)

FOREIGN PATENT DOCUMENTS

| | | |
|---|---|---|
| CN | 102348219 A | 2/2012 |
| CN | 102378222 A | 3/2012 |

(Continued)

OTHER PUBLICATIONS

3GPP TS 37.320 V15.0.0 (Jun. 2018), "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 15)," Jun. 2018, 27 pages.

3GPP TS 37.340 V15.4.0 (Dec. 2018), "3rd Generation Partnership Project; Technical Specification Group Radio Access Network; Evolved Universal Terrestrial Radio Access (E-UTRA) and NR; Multi-connectivity; Stage 2 (Release 15)," Dec. 2018, 67 pages.

(Continued)

*Primary Examiner* — Robert J Lopata
(74) *Attorney, Agent, or Firm* — Fish & Richardson P.C.

(57) ABSTRACT

The present disclosure relates to communication methods and communications apparatus. In one example communication method, a terminal device obtains measurement configuration information, where the measurement configuration information is used to indicate a target frequency for which logged minimization of drive tests (logged MDT) measurement is performed by the terminal device. The terminal device performs the logged MDT measurement for the target frequency.

20 Claims, 5 Drawing Sheets

First access network device

Second access network device

Terminal device

(56) References Cited

U.S. PATENT DOCUMENTS

| | | | | |
|---|---|---|---|---|
| 2016/0353295 | A1* | 12/2016 | Wu | H04W 72/51 |
| 2017/0311376 | A1* | 10/2017 | Cho | H04L 43/50 |
| 2018/0242181 | A1* | 8/2018 | Tsutsui | H04W 36/0061 |
| 2018/0242357 | A1* | 8/2018 | Khirallah | H04L 1/1896 |
| 2021/0029569 | A1* | 1/2021 | Kim | H04W 76/27 |
| 2021/0058806 | A1* | 2/2021 | Hong | B64C 39/024 |
| 2021/0160724 | A1* | 5/2021 | Yang | H04W 24/10 |

FOREIGN PATENT DOCUMENTS

| | | |
|---|---|---|
| CN | 102378241 A | 3/2012 |
| CN | 102404782 A | 4/2012 |
| CN | 102685793 A | 9/2012 |
| CN | 105122865 A | 12/2015 |
| CN | 109391958 A | 2/2019 |
| CN | 109413670 A | 3/2019 |
| CN | 109451549 A | 3/2019 |
| WO | 2015013192 A1 | 1/2015 |
| WO | 2015168861 A1 | 11/2015 |

OTHER PUBLICATIONS

3GPP TS 38.331 V15.4.0 (Dec. 2018), "3rd Generation Partnership Project; Technical Specification Group Radio Access Network; NR; Radio Resource Control (RRC) protocol specification (Release 15)," Dec. 2018, 474 pages.

Office Action issued in Chinese Application No. 201910252481.8 on Apr. 26, 2021, 15 pages (with English translation).

PCT International Search Report and Written Opinion issued in International Application No. PCT/CN2020/080832 on Jun. 29, 2020, 11 pages (partial English translation).

CMCC, Vodafone, NTT Docomo, Inc., "Neighbouring Cell Measurements Logging and Reporting," 3GPP TSG-RAN WG2 Meeting #71, R2-104552, Madrid, Spain, Aug. 23-27, 2010, 2 pages.

Extended European Search Report issued in European Application No. 20782584.5 on Feb. 2, 2022, 10 pages.

Samsung, "Idle mode MDT measurements, flows," 3GPP TSG-RAN2#70 bis meeting, Stockholm, Sweden, Jun. 28-Jul. 2, 2010, 7 pages.

Office Action issued in Chinese Application No. 201910252481.8 on Nov. 22, 2021, 15 pages (with English translation).

* cited by examiner

COMMUNICATION METHOD AND COMMUNICATIONS APPARATUS

CROSS-REFERENCE TO RELATED APPLICATIONS

This application is a continuation of International Application No. PCT/CN2020/080832, filed on Mar. 24, 2020, which claims priority to Chinese Patent Application No. 201910252481.8, filed on Mar. 29, 2019. The disclosures of the aforementioned applications are hereby incorporated by reference in their entireties.

TECHNICAL FIELD

Embodiments of this application relate to communications technologies and, in particular, to a communication method and a communications apparatus.

BACKGROUND

A network operator needs to evaluate network quality to detect and optimize network problems and faults, such as weak coverage, overshoot coverage, and coverage holes. In a 5G communications system or a future communications system, how to evaluate the network quality is a problem that needs to be considered.

SUMMARY

Embodiments of this application provide a communication method and a communications apparatus to evaluate network quality in a 5G communications system or a future communications system.

To achieve the foregoing objective, the embodiments of this application provide the following technical solutions.

According to a first aspect, an embodiment of this application provides a communication method, including: A terminal device obtains measurement configuration information, where the measurement configuration information is used to indicate a target frequency for which logged MDT measurement is performed by the terminal device; and the terminal device performs the logged MDT measurement for the target frequency. The logged MDT measurement is performed for the target frequency by the terminal device in a targeted manner so that network quality can be evaluated in a 5G communications system or a future communications system. Further, the logged MDT measurement is performed only for the target frequency, and logged MDT measurement does not need to be performed for another frequency so that energy consumption overheads of the terminal device can be reduced.

In a possible implementation, the measurement configuration information may be further used to indicate a target network type for which the logged MDT measurement is performed by the terminal device. Correspondingly, that the terminal device performs the logged MDT measurement for the target frequency may include: The terminal device performs the logged MDT measurement for the target network type corresponding to the target frequency. The logged MDT measurement is performed for the target network type corresponding to the target frequency and logged MDT measurement does not need to be performed for another network type corresponding to the target frequency so that the energy consumption overheads of the terminal device can be further reduced.

In a possible implementation, after the terminal device performs the logged MDT measurement for the target frequency, the method may further include: The terminal device sends a measurement report to an access network device, where the measurement report includes logged MDT measurement information of the target frequency. The measurement report including the logged MDT measurement information of the target frequency is sent to the access network device, and a measurement report including logged MDT measurement information of another frequency does not need to be transmitted so that air interface signaling overheads can be further reduced.

According to a second aspect, an embodiment of this application provides a communication method, including: A terminal device obtains measurement configuration information, where the measurement configuration information is used to indicate a target network type for which logged MDT measurement is performed by the terminal device; and the terminal device performs the logged MDT measurement for the target network type. The logged MDT measurement is performed for the target network type by the terminal device in a targeted manner so that network quality can be evaluated in a 5G communications system or a future communications system. Further, the logged MDT measurement is performed only for the target network type, and logged MDT measurement does not need to be performed for another network type so that energy consumption overheads of the terminal device can be reduced.

In a possible implementation, the measurement configuration information may be further used to indicate a target frequency for which the logged MDT measurement is performed by the terminal device. Correspondingly, that the terminal device performs the logged MDT measurement for the target network type may include: The terminal device performs the logged MDT measurement for the target frequency corresponding to the target network type. The logged MDT measurement is performed for the target frequency corresponding to the target network type, and logged MDT measurement does not need to be performed for another frequency corresponding to the target network type so that the energy consumption overheads of the terminal device can be further reduced.

In a possible implementation, after the terminal device performs the logged MDT measurement for the target network type, the method may further include: The terminal device sends a measurement report to an access network device, where the measurement report includes logged MDT measurement information of the target network type. The measurement report including the logged MDT measurement information of the target network type is sent to the access network device, and a measurement report including logged MDT measurement information of another network type does not need to be transmitted so that air interface signaling overheads can be further reduced.

On the basis of the first aspect or the second aspect, the following implementations may be further provided.

In a possible implementation, that a terminal device obtains measurement configuration information may include: receiving a logged measurement configuration message from the access network device, where the logged measurement configuration message includes the measurement configuration information. The terminal device obtains the measurement configuration information by receiving the logged measurement configuration message from the access network device.

In a possible implementation, that a terminal device obtains measurement configuration information may include: receiving an RRC release message from the access network device, where the RRC release message includes the measurement configuration information. The terminal device obtains the measurement configuration information by receiving the RRC release message from the access network device.

In a possible implementation, the RRC release message may further include a timer used to indicate the terminal device to perform the logged MDT measurement. In this way, in the first aspect, that the terminal device performs the logged MDT measurement for the target frequency may include: The terminal device performs the logged MDT measurement for the target frequency within a time indicated by the timer; and in the second aspect, that the terminal device performs the logged MDT measurement for the target network type may include: The terminal device performs the logged MDT measurement for the target network type within a time indicated by the timer. The logged MDT measurement is performed for the target frequency or the target network type within the time indicated by the timer so that the energy consumption overheads of the terminal device can be further reduced.

In a possible implementation, that a terminal device obtains measurement configuration information may include. The terminal device receives a broadcast message from the access network device, where the broadcast message includes the measurement configuration information. The terminal device obtains the measurement configuration information by receiving the broadcast message from the access network device.

According to a third aspect, an embodiment of this application provides a communication method, including: An access network device sends measurement configuration information to a terminal device, where the measurement configuration information is used to indicate a target frequency for which logged MDT measurement is performed by the terminal device; and the access network device receives a measurement report from the terminal device, where the measurement report includes logged MDT measurement information of the target frequency. The logged MDT measurement is performed for the target frequency by the terminal device in a targeted manner so that in this embodiment of this application, network quality can be evaluated in a 5G communications system or a future communications system. Further, the logged MDT measurement is performed only for the target frequency, and logged MDT measurement does not need to be performed for another frequency so that energy consumption overheads of the terminal device can be reduced. In addition, only the measurement report including the logged MDT measurement information of the target frequency is transmitted, and a measurement report including logged MDT measurement information of another frequency does not need to be transmitted so that air interface signaling overheads can be further reduced.

In a possible implementation, the measurement configuration information may be further used to indicate a target network type for which the logged MDT measurement is performed by the terminal device. Correspondingly, the measurement report includes logged MDT measurement information of the target network type corresponding to the target frequency. The logged MDT measurement is performed for the target network type corresponding to the target frequency, and logged MDT measurement does not need to be performed for another network type corresponding to the target frequency so that the energy consumption overheads of the terminal device can be further reduced.

According to a fourth aspect, an embodiment of this application provides a communication method, including: An access network device sends measurement configuration information to a terminal device, where the measurement configuration information is used to indicate a target network type for which logged MDT measurement is performed by the terminal device; and the access network device receives a measurement report from the terminal device, where the measurement report includes logged MDT measurement information of the target network type. The logged MDT measurement is performed for the target network type by the terminal device in a targeted manner so that in this embodiment of this application, network quality can be evaluated in a 5G communications system or a future communications system. Further, the logged MDT measurement is performed only for the target network type, and logged MDT measurement does not need to be performed for another network type so that energy consumption overheads of the terminal device can be reduced. In addition, only the measurement report including the logged MDT measurement information of the target network type is transmitted, and a measurement report including logged MDT measurement information of another network type does not need to be transmitted so that air interface signaling overheads can be further reduced.

In a possible implementation, the measurement configuration information may be further used to indicate a target frequency for which the logged MDT measurement is performed by the terminal device. Correspondingly, the measurement report may include logged MDT measurement information of the target frequency corresponding to the target network type. The logged MDT measurement is performed for the target frequency corresponding to the target network type, and logged MDT measurement does not need to be performed for another frequency corresponding to the target network type so that the energy consumption overheads of the terminal device can be further reduced.

On the basis of the third aspect or the fourth aspect, the following implementations may be further provided.

In a possible implementation, that an access network device sends measurement configuration information to a terminal device may include: The access network device sends a logged measurement configuration message to the terminal device, where the logged measurement configuration message includes the measurement configuration information. The access network device sends the measurement configuration information to the terminal device by using the logged measurement configuration message.

In a possible implementation, that an access network device sends measurement configuration information to a terminal device may include: The access network device sends an RRC release message to the terminal device, where the RRC release message includes the measurement configuration information. The access network device sends the measurement configuration information to the terminal device by using the RRC release message.

In a possible implementation, the RRC release message may further include a timer used to indicate the terminal device to perform the logged MDT measurement. In this way, in the third aspect, the measurement report may include the logged MDT measurement information of the target frequency within a time indicated by the timer; and in the fourth aspect, the measurement report may include the logged MDT measurement information of the target network type within a time indicated by the timer. The measurement report is reported within the time indicated by the timer so that the energy consumption overheads of the terminal device and the air interface signaling overheads can be further reduced.

In a possible implementation, that an access network device sends measurement configuration information to a terminal device may include: The access network device sends a broadcast message to the terminal device, where the broadcast message includes the measurement configuration information. The access network device sends the measurement configuration information to the terminal device by using the broadcast message.

According to a fifth aspect, an embodiment of this application provides a communications apparatus, including an obtaining module and a processing module. The obtaining module is configured to obtain measurement configuration information, where the measurement configuration information is used to indicate a target frequency for which logged MDT measurement is performed by a terminal device; and the processing module is configured to perform the logged MDT measurement for the target frequency. The logged MDT measurement is performed for the target frequency by the terminal device in a targeted manner so that network quality can be evaluated in a 5G communications system or a future communications system. Further, the logged MDT measurement is performed only for the target frequency, and logged MDT measurement does not need to be performed for another frequency so that energy consumption overheads of the terminal device can be reduced.

In a possible implementation, the measurement configuration information may be further used to indicate a target network type for which the logged MDT measurement is performed by the terminal device. Correspondingly, the processing module may be specifically configured to perform the logged MDT measurement for the target network type corresponding to the target frequency. The logged MDT measurement is performed for the target network type corresponding to the target frequency, and logged MDT measurement does not need to be performed for another network type corresponding to the target frequency so that the energy consumption overheads of the terminal device can be further reduced.

In a possible implementation, the apparatus may further include a sending module, configured to: after the processing module performs the logged MDT measurement for the target frequency, send a measurement report to an access network device, where the measurement report includes logged MDT measurement information of the target frequency. The measurement report including the logged MDT measurement information of the target frequency is sent to the access network device, and a measurement report including logged MDT measurement information of another frequency does not need to be transmitted so that air interface signaling overheads can be further reduced.

According to a sixth aspect, an embodiment of this application provides a communications apparatus, including: an obtaining module, configured to obtain measurement configuration information, where the measurement configuration information is used to indicate a target network type for which logged MDT measurement is performed by a terminal device; and a processing module, configured to perform the logged MDT measurement for the target network type. The logged MDT measurement is performed for the target network type by the terminal device in a targeted manner so that network quality can be evaluated in a 5G communications system or a future communications system. Further, the logged MDT measurement is performed only for the target network type, and logged MDT measurement does not need to be performed for another network type so that energy consumption overheads of the terminal device can be reduced.

In a possible implementation, the measurement configuration information may be further used to indicate a target frequency for which the logged MDT measurement is performed by the terminal device. Correspondingly, the processing module may be specifically configured to perform the logged MDT measurement for the target frequency corresponding to the target network type. The logged MDT measurement is performed for the target frequency corresponding to the target network type, and logged MDT measurement does not need to be performed for another frequency corresponding to the target network type so that the energy consumption overheads of the terminal device can be further reduced.

In a possible implementation, the apparatus may further include a sending module, configured to: after the processing module performs the logged MDT measurement for the target network type, send a measurement report to an access network device, where the measurement report includes logged MDT measurement information of the target network type. The measurement report including the logged MDT measurement information of the target network type is sent to the access network device, and a measurement report including logged MDT measurement information of another network type does not need to be transmitted so that air interface signaling overheads can be further reduced.

On the basis of the fifth aspect or the sixth aspect, the following implementations may be further provided.

In a possible implementation, the obtaining module may be specifically configured to: receive a logged measurement configuration message from the access network device, where the logged measurement configuration message includes the measurement configuration information. The measurement configuration information is obtained by receiving the logged measurement configuration message from the access network device.

In a possible implementation, the obtaining module may be specifically configured to: receive an RRC release message from the access network device, where the RRC release message includes the measurement configuration information. The measurement configuration information is obtained by receiving the RRC release message from the access network device.

In a possible implementation, the RRC release message may further include a timer used to indicate the terminal device to perform the logged MDT measurement. In this way, in the fifth aspect, the processing module may be specifically configured to perform the logged MDT measurement for the target frequency within a time indicated by the timer; and in the sixth aspect, the processing module may be specifically configured to perform the logged MDT measurement for the target network type within a time indicated by the timer. The logged MDT measurement is performed for the target frequency or the target network type within the time indicated by the timer so that the energy consumption overheads of the terminal device can be further reduced.

In a possible implementation, the obtaining module may be specifically configured to: receive a broadcast message from the access network device, where the broadcast message includes the measurement configuration information. The measurement configuration information is obtained by receiving the broadcast message from the access network device.

It should be noted that the communications apparatus in the fifth aspect or the sixth aspect may be the terminal device, or may be a chip that can be used in the terminal device.

According to a seventh aspect, an embodiment of this application provides a communications apparatus, including a sending module and a receiving module. The sending module is configured to send measurement configuration information to a terminal device, where the measurement configuration information is used to indicate a target frequency for which logged MDT measurement is performed by the terminal device; and the receiving module is configured to receive a measurement report from the terminal device. The measurement report includes logged MDT measurement information of the target frequency. The logged MDT measurement is performed for the target frequency by the terminal device in a targeted manner so that in this embodiment of this application, network quality can be evaluated in a 5G communications system or a future communications system. Further, the logged MDT measurement is performed only for the target frequency, and logged MDT measurement does not need to be performed for another frequency so that energy consumption overheads of the terminal device can be reduced. In addition, only the measurement report including the logged MDT measurement information of the target frequency is transmitted, and a measurement report including logged MDT measurement information of another frequency does not need to be transmitted so that air interface signaling overheads can be further reduced.

In a possible implementation, the measurement configuration information may be further used to indicate a target network type for which the logged MDT measurement is performed by the terminal device. Correspondingly, the measurement report includes logged MDT measurement information of the target network type corresponding to the target frequency. The logged MDT measurement is performed for the target network type corresponding to the target frequency, and logged MDT measurement does not need to be performed for another network type corresponding to the target frequency so that the energy consumption overheads of the terminal device can be further reduced.

According to an eighth aspect, an embodiment of this application provides a communications apparatus, including: a sending module, configured to send measurement configuration information to a terminal device, where the measurement configuration information is used to indicate a target network type for which logged MDT measurement is performed by the terminal device; and a receiving module, configured to receive a measurement report from the terminal device, where the measurement report includes logged MDT measurement information of the target network type. The logged MDT measurement is performed for the target network type by the terminal device in a targeted manner so that in this embodiment of this application, network quality can be evaluated in a 5G communications system or a future communications system. Further, the logged MDT measurement is performed only for the target network type, and logged MDT measurement does not need to be performed for another network type so that energy consumption overheads of the terminal device can be reduced. In addition, only the measurement report including the logged MDT measurement information of the target network type is transmitted, and a measurement report including logged MDT measurement information of another network type does not need to be transmitted so that air interface signaling overheads can be further reduced.

In a possible implementation, the measurement configuration information may be further used to indicate a target frequency for which the logged MDT measurement is performed by the terminal device. Correspondingly, the measurement report may include logged MDT measurement information of the target frequency corresponding to the target network type. The logged MDT measurement is performed for the target frequency corresponding to the target network type, and logged MDT measurement does not need to be performed for another frequency corresponding to the target network type so that the energy consumption overheads of the terminal device can be further reduced.

On the basis of the seventh aspect or the eighth aspect, the following implementations may be further provided.

In a possible implementation, the sending module may be specifically configured to: send a logged measurement configuration message to the terminal device, where the logged measurement configuration message includes the measurement configuration information. The measurement configuration information is sent to the terminal device by using the logged measurement configuration message.

In a possible implementation, the sending module may be specifically configured to: send an RRC release message to the terminal device, where the RRC release message includes the measurement configuration information. The measurement configuration information is sent to the terminal device by using the RRC release message.

In a possible implementation, the RRC release message may further include a timer used to indicate the terminal device to perform the logged MDT measurement. In this way, in the seventh aspect, the measurement report may include the logged MDT measurement information of the target frequency within a time indicated by the timer; and in the eighth aspect, the measurement report may include the logged MDT measurement information of the target network type within a time indicated by the timer. The measurement report is reported within the time indicated by the timer so that the energy consumption overheads of the terminal device and the air interface signaling overheads can be further reduced.

In a possible implementation, the sending module may be specifically configured to: send a broadcast message to the terminal device, where the broadcast message includes the measurement configuration information. The measurement configuration information is sent to the terminal device by using the broadcast message.

It should be noted that the communications apparatus in the seventh aspect or the eighth aspect may be the access network device, or may be a chip that can be used in the access network device.

Further, on the basis of any one of the foregoing possible implementations:

In a possible implementation, the measurement configuration information may include first information corresponding to a frequency, and the first information is used to indicate whether the terminal device performs logged MDT measurement for the frequency, and the frequency herein includes the target frequency. Optionally, the first information is in a one-to-one correspondence with the frequency.

In a possible implementation, the measurement configuration information may include second information including M bits, the M bits respectively correspond to M frequencies, a bit value is used to indicate whether the terminal device performs the logged MDT measurement for a frequency, and the frequency herein includes the target frequency. Optionally, the bits in the second information are in a one-to-one correspondence with the frequencies.

In a possible implementation, the measurement configuration information may further include third information corresponding to a network type, and the third information used to indicate whether the terminal device performs logged MDT measurement for the network type, where the network type includes the target network type. Alternatively, the measurement configuration information includes fourth information including N bits, where the N bits respectively correspond to N network types, a bit value is used to indicate whether the terminal device performs the logged MDT measurement for a network type, and the network type includes the target network type. Optionally, the third information is in a one-to-one correspondence with the network type, or the bits in the fourth information are in a one-to-one correspondence with the network types.

On the basis of the first aspect, the third aspect, the fifth aspect, or the seventh aspect, the third information is used to indicate whether the terminal device performs logged MDT measurement for a network type corresponding to the target frequency, and the bit value in the fourth information is used to indicate whether the terminal device performs logged MDT measurement for a network type corresponding to the target frequency.

On the basis of the second aspect, the fourth aspect, the sixth aspect, or the eighth aspect, the first information is used to indicate whether the terminal device performs logged MDT measurement for a frequency corresponding to the target network type, and the bit value in the second information is used to indicate whether the terminal device performs logged MDT measurement for a frequency corresponding to the target network type.

In a possible implementation, the target network type may be used to indicate a core network connected to the target frequency, and the core network includes at least one of the following: a 5G core network 5GC or a 4G core network EPC.

In a possible implementation, the access network device indicates, by using the RRC release message, the target frequency for which early measurement or idle mode measurement is performed by the terminal device so that when performing the logged MDT measurement, the terminal device logs a measurement result of the target frequency during the early measurement or the idle mode measurement.

Optionally, the broadcast message may include at least one of the following messages: a SIB 2, a SIB 3, a SIB 4, or a SIB 5. The SIB 2 includes cell re-selection information used for intra-frequency, inter-frequency, and/or inter-RAT cell re-selection, and intra-frequency cell re-selection information other than a neighboring cell. The SIB 3 includes information that is related to a neighboring cell and that is used only for intra-frequency cell re-selection. The SIB 4 includes information used only for inter-frequency cell re-selection. The SIB 5 includes information used only for inter-RAT cell re-selection.

Optionally, the access network device indicates, by using the broadcast message, the target frequency for which early measurement or idle mode measurement is performed by the terminal device so that when performing the logged MDT measurement, the terminal device logs a measurement result of the target frequency during the early measurement or the idle mode measurement. The early measurement or the idle mode measurement means that in an MR-DC scenario, a first access network device indicates the terminal device, in RRC idle mode or inactive mode, to measure a second access network device so that the first access network device learns of a measurement result of a corresponding cell or an SSB in the second access network device in advance to determine whether to use the second access network device as a secondary access network device in the MR-DC.

According to a ninth aspect, an embodiment of this application provides a communication method, including: A first access network device sends an RRC release message to a terminal device, where the RRC release message includes information used to indicate a target frequency for which measurement is performed by the terminal device and a timer corresponding to the measurement; and the first access network device receives a measurement report from the terminal device, where the measurement report includes measurement information of the target frequency within a time indicated by the timer. The measurement is performed for the target frequency by the terminal device in a targeted manner within the time indicated by the timer so that in this embodiment of this application, network quality can be evaluated in a 5G communications system or a future communications system. Further, logged MDT measurement is performed only for the target frequency within the time indicated by the timer, and logged MDT measurement does not need to be performed for another frequency or on the target frequency at a time other than the time indicated by the timer so that energy consumption overheads of the terminal device can be reduced.

According to a tenth aspect, an embodiment of this application provides a communication method, including: A terminal device receives an RRC release message from a first access network device, where the RRC release message includes information used to indicate a target frequency for which measurement is performed by the terminal device and a timer corresponding to the measurement; and the terminal device measures the target frequency within a time indicated by the timer. The measurement is performed for the target frequency by the terminal device in a targeted manner within the time indicated by the timer so that in this embodiment of this application, network quality can be evaluated in a 5G communications system or a future communications system. Further, logged MDT measurement is performed only for the target frequency within the time indicated by the timer, and logged MDT measurement does not need to be performed for another frequency or on the target frequency at a time other than the time indicated by the timer so that energy consumption overheads of the terminal device can be reduced.

Optionally, the terminal device sends a measurement report to the first access network device, where the measurement report includes measurement information of the target frequency within the time indicated by the timer. Only the measurement report including the measurement information of the target frequency within the time indicated by the timer is reported so that air interface signaling overheads can be reduced.

On the basis of the ninth aspect or the tenth aspect, the following implementations may be further provided.

In a possible implementation, the measurement includes at least one of the following measurements: early measurement, idle mode measurement, or logged MDT measurement.

In a possible implementation, the target frequency is a frequency in a second access network device. Optionally, the RRC release message includes information used to indicate the terminal device to measure the target frequency in the second access network device.

Optionally, when the terminal device switches from RRC idle mode to RRC connected mode, or when the terminal device switches from inactive mode to RRC connected mode, the terminal device indicates, to the first access network device, that the terminal device logs a result of the early measurement or the idle mode measurement.

Optionally, the target frequency is used to indicate information for the terminal device to perform the logged MDT measurement for the target frequency. In this embodiment, a cell or an SSB corresponding to the target frequency is a cell or an SSB in the second access network device in an MR-DC scenario.

Optionally, the timer is used to indicate an effective time range of the measurement, that is, a start time and an end time of the measurement.

Optionally, the timer is used to indicate the end time of the measurement. The start time of the measurement is a time at which the terminal device receives the RRC release message from the first access network device. In other words, the terminal device starts the timer when receiving the RRC release message from the first access network device.

Optionally, the target frequency is used to indicate a target frequency for which early measurement or idle mode measurement is performed by the terminal device. The timer may also be used to indicate a time within which the early measurement or the idle mode measurement is performed or an end time.

Optionally, the target frequency may be further used to indicate the information for the terminal device to perform the logged MDT measurement for the target frequency and indicate the target frequency for which the early measurement or the idle mode measurement is performed by the terminal device. The timer may be further used to indicate a time (including a start time and an end time) within which the logged MDT measurement is performed or an end time, and used to indicate a time (including a start time and an end time) within which the early measurement or the idle mode measurement is performed or an end time.

Optionally, the RRC release message further includes a priority of the target frequency, and the priority is used to indicate the terminal device to preferentially measure a target frequency with a high priority.

According to an eleventh aspect, an embodiment of this application provides a communications apparatus, including a memory and a processor.

The memory stores a computer program that can be executed by the processor; and when the processor reads and executes the computer program, the communications apparatus is enabled to perform the method according to any one of the first aspect, the second aspect, the third aspect, the fourth aspect, the ninth aspect, or the tenth aspect.

It should be noted that the communications apparatus in the ninth aspect may be the terminal device or the access network device, or may be a chip that can be used in the terminal device or the access network device.

According to a twelfth aspect, an embodiment of this application provides a computer-readable storage medium. The computer-readable storage medium stores a computer program, the computer program includes at least one segment of code, and the at least one segment of code may be executed by a processor to implement the communication method according to any one of the first aspect, the second aspect, the third aspect, the fourth aspect, the ninth aspect, or the tenth aspect.

According to a thirteenth aspect, an embodiment of this application provides a chip. The chip stores a computer program, and when the computer program is executed by a processor, the communication method according to any one of the embodiments in the first aspect, the second aspect, the third aspect, the fourth aspect, the ninth aspect, or the tenth aspect is performed.

According to a fourteenth aspect, an embodiment of this application provides a program product, including a computer program. The computer program is stored in a readable storage medium, at least one processor of a communications apparatus may read the computer program from the readable storage medium, and the at least one processor executes the computer program so that the communications apparatus performs the communication method according to any one of the embodiments in the first aspect, the second aspect, the third aspect, the fourth aspect, the ninth aspect, or the tenth aspect.

The foregoing and other aspects of this application are clearer and easier to understand in descriptions of the following (a plurality of) embodiments.

DESCRIPTION OF EMBODIMENTS

Figure 1:
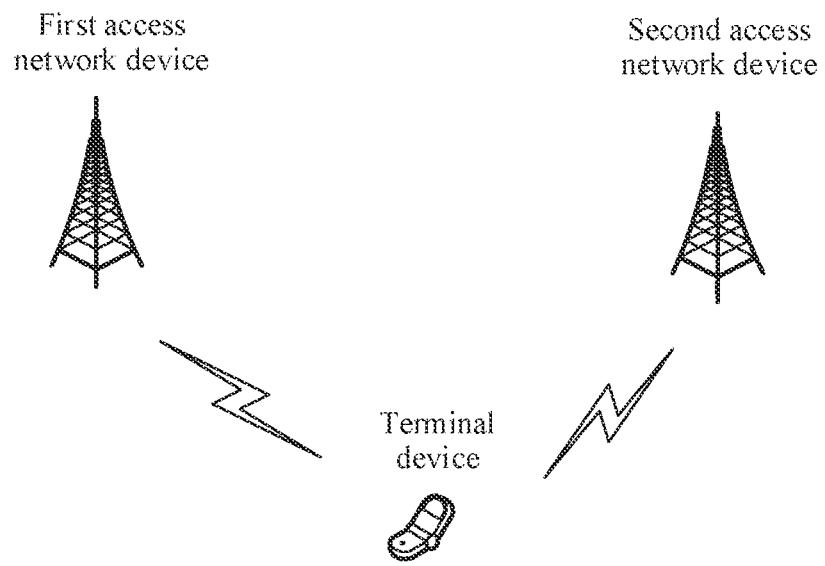
FIG. 1 is an example diagram of a communications system according to an embodiment of this application.

It should be understood that the term "and/or" in this specification describes only an association relationship for describing associated objects and represents that three relationships may exist. For example, A and/or B may represent the following three cases: Only A exists, both A and B exist, and only B exists.

In the following, some terms in the embodiments of this application are described, to facilitate understanding of a person skilled in the art.

Logged minimization of drive tests (logged MDT) measurement is MDT performed by a terminal device in radio resource control (RRC) idle mode or inactive mode. The terminal device stores a measurement result, and the terminal device reports the measurement result to an access network device when switching to RRC connected mode. The logged MDT measurement may include at least one of the following: random access channel failure measurement, signal strength measurement, connection setup failure measurement, radio link failure measurement, or the like.

Immediate MDT measurement is MDT performed by a terminal device in RRC connected mode. Once a configured MDT reporting condition is met, the terminal device reports a measurement result to an access network device. The immediate MDT measurement may include at least one of the following: data volume measurement of the terminal, throughput rate measurement, packet transmission delay measurement, packet loss rate measurement, processing delay measurement, or the like.

The access network device, also referred to as a radio access network (RAN) device, is a device that connects a terminal device to a wireless network, and may allocate and release a radio resource to the terminal device. For example, the access network device may have the following forms:

gNB: provides a new radio (NR) control plane and/or user plane protocol and function for the terminal device, and accesses a 5G core network (5th generation core, 5GC);

en-gNB: provides an NR control plane and/or user plane protocol and function for the terminal device, and accesses a 4G core network, for example, an evolved packet core (EPC);

evolved NodeB (eNB or eNodeB): provides an evolved universal terrestrial radio access (E-UTRA) control plane and/or user plane protocol and function for the terminal device, and accesses a 4G core network, for example, an EPC;

ng-eNB: provides an E-UTRA control plane and/or user plane protocol and function for the terminal device, and accesses a 5G core network (5GC);

eNB: provides an E-UTRA control plane and/or user plane protocol and function for the terminal device, and accesses a 4G core network, for example, an EPC;

central unit (CU): mainly includes an RRC layer, a service data adaptation protocol (SDAP) layer, and a packet data convergence protocol (PDCP) layer of a gNB, or an RRC layer and a PDCP layer of an ng-eNB;

distributed unit (DU): mainly includes a radio link control (RLC) layer, a medium access control (MAC) layer, and a physical layer of a gNB or an ng-eNB;

central unit-control plane (CU-CP): a control plane of a central unit, mainly including an RRC layer in a gNB-CU or an ng-eNB-CU and a control plane in a PDCP layer; or central unit-user plane (CU-UP): a user plane of a central unit, mainly including an SDAP layer in a gNB-CU or an ng-eNB-CU and a user plane in a PDCP layer.

The terminal device may also be referred to as user equipment (UE), a terminal, an access terminal, a subscriber unit, a subscriber station, a mobile station, a remote station, a remote terminal, a mobile device, a user terminal, a wireless communications device, a user agent, a user apparatus, or the like. The terminal device may be a wireless terminal or a wired terminal. The wireless terminal may refer to a device having a wireless transceiver function, and may be deployed on land, including an indoor or outdoor device, a handheld device, or a vehicle-mounted device; or may be deployed on a water surface (for example, on a steamboat); or may be deployed in the air (for example, on an airplane, a balloon, or a satellite). The terminal device may be an unmanned aerial vehicle, an internet of things (IoT) device (for example, a sensor, an electricity meter, or a water meter), a vehicle-to-everything (V2X) device, a station (ST) in a wireless local area network (WLAN), a cellular phone, a cordless phone, a session initiation protocol (SIP) telephone, a wireless local loop (WLL) station, a personal digital assistant (PDA) device, a handheld device with a wireless communication function, a computing device or another processing device connected to a wireless modem, a vehicle-mounted device, or a wearable device (which may also be referred to as a wearable intelligent device). The terminal may alternatively be a terminal in a next-generation communications system, for example, a terminal in a 5G communications system, a terminal in a future evolved public land mobile network (PLMN), or a terminal in an NR communications system. This is not limited herein.

When the access network device requires the terminal device to perform logged MDT measurement, the access network device sends a logged measurement configuration message to the terminal device. The logged measurement configuration message includes a "logged area configuration" parameter that is used to indicate an area in which the terminal device performs the logged MDT measurement. To be specific, when the terminal device is located in the configured area, the terminal device performs the logged measurement. The configured area can be in either of the following modes:

cell mode: The terminal device performs the logged MDT measurement only when camping on these cells; and tracking area mode: The terminal device performs the logged MDT measurement only when camping on a cell in these tracking areas.

FIG. 1 is an example diagram of a communications system according to an embodiment of this application. As shown in FIG. 1, the communications system includes a first access network device, a second access network device, and a terminal device.

The terminal device can communicate with the first access network device or the second access network device, or the terminal device can simultaneously communicate with the first access network device and the second access network device, that is, performs multi-radio dual connectivity (MR-DC). In an MR-DC scenario, the first access network device may be a primary access network device, the second access network device may be a secondary access network device, and the first access network device and the second access network device may be access network devices of different communications standards, or may be access network devices of a same communications standard.

Figure 2:
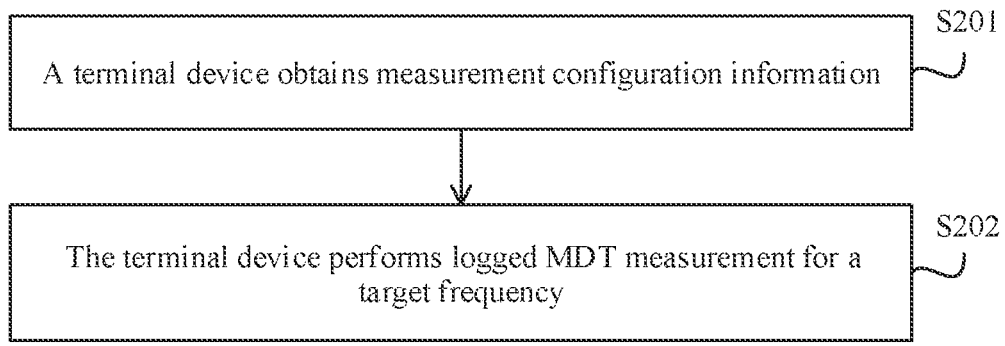
FIG. 2 is a schematic flowchart of a communication method according to an embodiment of this application.

FIG. 2 is a schematic flowchart of a communication method according to an embodiment of this application. This embodiment of this application provides a communication method. The communication method may be performed by a communications apparatus, and the communications apparatus may be implemented by using software and/or hardware. For example, the communications apparatus may be integrated into a terminal device, or the communications apparatus is a terminal device.

As shown in FIG. 2, the communication method includes the following steps.

S201. A terminal device obtains measurement configuration information.

The measurement configuration information is used to indicate a target frequency for which logged MDT measurement is performed by the terminal device. The measurement configuration information is from an access network device to the terminal device.

S202. The terminal device performs the logged MDT measurement for the target frequency.

A specific frequency (that is, the target frequency) for which the logged MDT measurement needs to be performed by the terminal device is specified so that the terminal device needs to perform the logged MDT measurement for the specific frequency, thereby reducing energy consumption of the terminal device.

In addition, a concept of a synchronization signal and physical broadcast channel block (SSB) is introduced in a 5th generation communications system. Specifically, the SSB includes a primary synchronization signal (PSS), a secondary synchronization signal (SSS), and a physical broadcast channel (PBCH), and occupies four symbols in time domain and 240 subcarriers in frequency domain. Within a frequency range of one carrier, a plurality of SSBs may be transmitted. Each SSB corresponds to one physical cell identifier (PCI), and PCIs of the SSBs may be the same or may be different. The terminal device may obtain the physical cell identifier and slot synchronization by using the PSS. The terminal device may obtain a cyclic prefix (CP) length, a physical cell group ID, and frame synchronization by using the SSS. The terminal device can obtain a master information block (MIB) by decoding the PBCH, including configuration information of a quantity of common antenna ports, configuration information of a system frame number (SFN), configuration information of a downlink system bandwidth, and configuration information of physical hybrid automatic repeat request indication information (PHICH).

Specifically, when an SSB is associated with remaining minimum system information (RMSI), the SSB corresponds to an independent cell, and the cell has a unique NR cell global identifier (NCGI). In this case, the SSB is referred to as a cell-defining SSB (CD-SSB). Only the CD-SSB can be used to send a master information block (MIB) message and a system information block 1 (SIB1) message, and when performing cell selection, the terminal device performs access based only on a synchronization signal of the CD-SSB. Another SSB can be used to send only a MIB message and cannot be used to send a SIB 1 message.

It should be understood that a type of the SSB is not limited in this application, and the type includes the foregoing CD-SSB and an SSB other than the CD-SSB.

It should be further understood that a basic concept of the SSB is already defined in detail in an existing protocol. This application merely briefly describes the SSB. The foregoing descriptions of the SSB cannot limit the protection scope of this application, but is merely intended to increase understanding of the embodiments of this application.

Therefore, this step may include: The terminal device performs logged MDT measurement for the cell or the SSB based on the target frequency. The terminal device performs the logged MDT measurement for the target frequency, and the measurement process occurs when the terminal device is in RRC idle mode or inactive mode.

For example, the terminal device performs the logged MDT measurement for the target frequency based on the measurement configuration information. It may be understood that, in a long term evolution (LTE) system, a cell corresponds to an evolved universal terrestrial radio access network cell global identifier (ECGI), and different cells may be distinguished between by using ECGIs. Considering that multi-frequency deployment in 5G enables different frequencies to be deployed in a same cell, the measurement configuration information in the embodiments of this application is used to indicate the target frequency for which the logged MDT measurement is performed by the terminal device, and the logged MDT measurement is performed for the target frequency. For example, a frequency 1, a frequency 2, a frequency 3, and the like are deployed in a cell A. If the measurement configuration information indicates that the target frequency for which the logged MDT measurement is performed by the terminal device is the frequency 2, the terminal device performs the logged MDT measurement for the frequency 2, but does not perform the logged MDT measurement for the frequency 1, the frequency 3, and another frequency.

Frequency information of the cell or the SSB may be in the following forms:

(1). Radio frequency reference frequency (RF).

It may be understood that each cell or SSB corresponds to one radio frequency reference frequency, and the radio frequency reference frequency of the cell or the SSB is used to identify a location of the cell or the SSB, that is, a frequency of the cell or the SSB.

(2). Absolute radio frequency channel number (ARFCN).

The radio frequency reference frequency described in (1) may be indicated by an NR absolute radio frequency channel number or an E-UTRAN absolute radio frequency channel number. That is, when a frequency of a cell or an SSB is the radio frequency reference frequency of the cell or the SSB, the frequency may also be understood as the NR absolute radio frequency channel number or the E-UTRAN absolute radio frequency channel number of the cell or the SSB.

(3). Operating frequency band of a carrier.

It may be understood that, because each cell or SSB has a corresponding operating frequency band of a carrier, the cell or the SSB may be indirectly determined by indicating the operating frequency band of the carrier in which the cell or the SSB is located.

Optionally, in all the embodiments of this application, frequency information in the measurement configuration information may be frequency information of a current communications standard corresponding to a primary access network device when the terminal device receives the logged measurement configuration message, or may be frequency information of a current communications standard corresponding to a secondary access network device, or may include frequency information of current communications standards corresponding to a primary access network device and a secondary access network device, or may be frequency information of another communications standard. This is not specifically limited in this application.

In this embodiment, the terminal device obtains the measurement configuration information, where the measurement configuration information is used to indicate the target frequency for which the logged MDT measurement is performed by the terminal device; and the terminal device performs the logged MDT measurement for the target frequency. The logged MDT measurement is performed for the target frequency by the terminal device in a targeted manner so that in this embodiment of this application, network quality can be evaluated in a 5G communications system or a future communications system. Further, the logged MDT measurement is performed only for the target frequency, and logged MDT measurement does not need to be performed for another frequency so that energy consumption overheads of the terminal device can be further reduced.

Further, after the terminal device performs the logged MDT measurement for the target frequency, the terminal device may send a measurement report to the access network device. The measurement report is reported when the terminal device is in connected mode, and the terminal device reports the measurement report to the access network device when switching from RRC idle mode or inactive mode to RRC connected mode. The measurement report includes logged MDT measurement information of the target frequency. A measurement report including logged MDT measurement information of another frequency does not need to be transmitted so that a data volume of the measurement report is reduced, thereby further reducing energy consumption of the terminal device and air interface signaling overheads.

On the basis of the foregoing embodiment, in an implementation, that a terminal device obtains measurement configuration information in S201 may include: The terminal device receives a logged measurement configuration message from the access network device, where the logged measurement configuration message includes the measurement configuration information.

Figure 3:
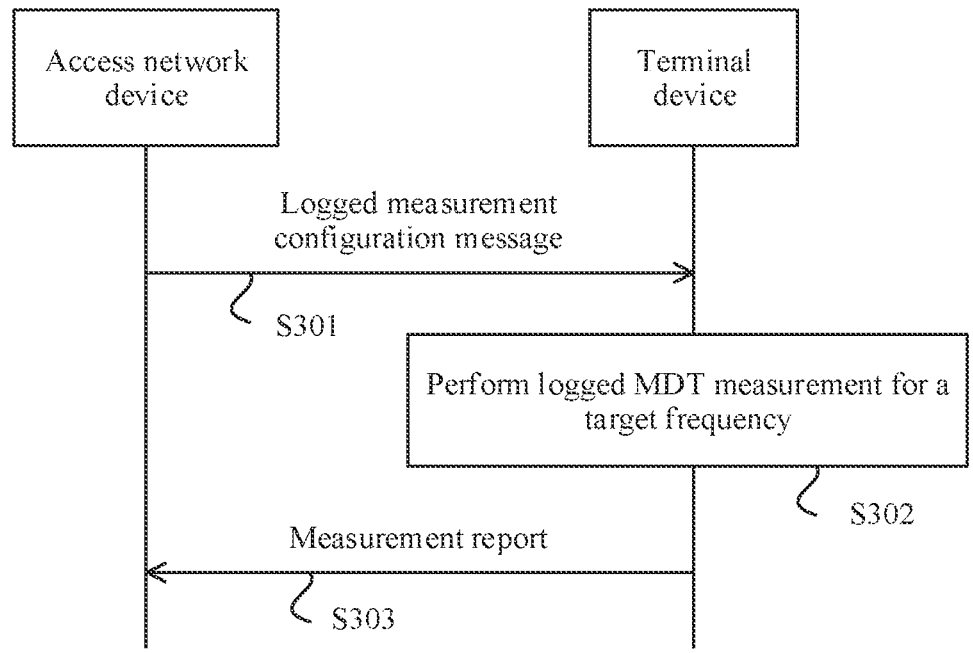
FIG. 3 is a signaling diagram of a communication method according to another embodiment of this application.

In this implementation, as shown in FIG. 3, the communication method may include the following steps.

S301. The access network device sends the logged measurement configuration message to the terminal device.

Correspondingly, the terminal device receives the logged measurement configuration message from the access network device.

S302. The terminal device performs the logged MDT measurement for the target frequency.

S303. The terminal device sends a measurement report to the access network device.

Correspondingly, the access network device receives the measurement report from the terminal device.

Specifically, the access network device sends the logged measurement configuration message to the terminal device, where the logged measurement configuration message includes a related configuration that is used to indicate the terminal device to perform the logged MDT measurement so that the terminal device performs the logged MDT measurement in RRC idle mode or inactive mode. In other words, the message is used to transfer a configuration parameter of the logged MDT measurement. The configuration parameter includes information of the target frequency that is used to indicate the terminal device to perform the logged MDT measurement for the target frequency. For example, if the frequency included in the configuration parameter is B20, the terminal device performs the logged MDT measurement for the frequency B20. Correspondingly, the terminal device performs the logged MDT measurement in RRC idle mode or inactive mode based on the measurement configuration information in the logged measurement configuration message, to obtain the measurement report, and sends the measurement report to the access network device after switching from RRC idle mode or inactive mode to RRC connected mode.

In another implementation, that a terminal device obtains measurement configuration information in S201 may include: The terminal device receives an RRC release message from the access network device, where the RRC release message includes the measurement configuration information. The RRC release message may also be referred to as an RRC connection release message.

Figure 4:
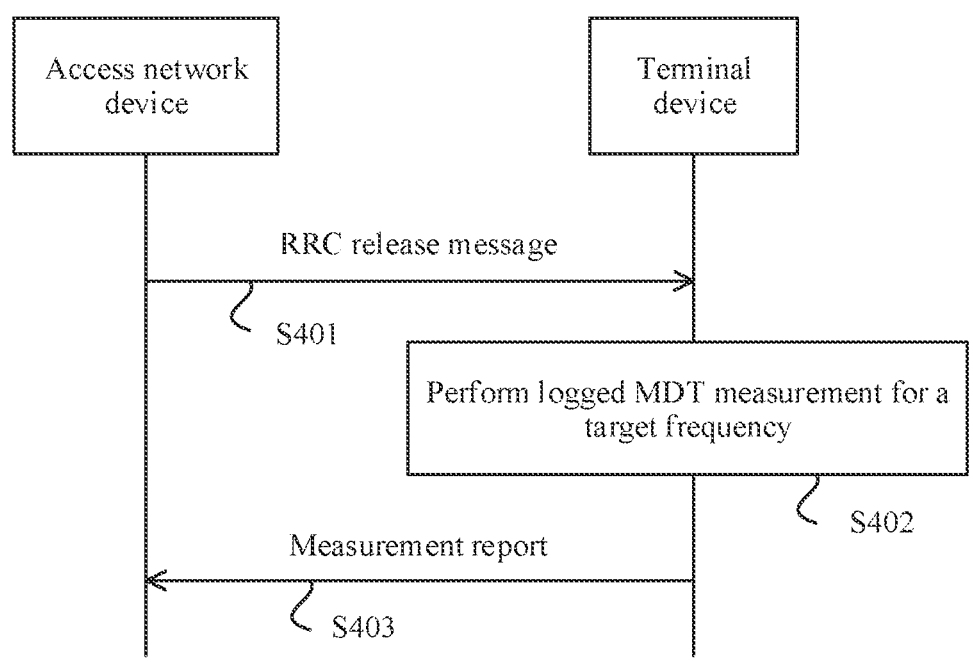
FIG. 4 is a signaling diagram of a communication method according to still another embodiment of this application.

In this implementation, as shown in FIG. 4, the communication method may include the following steps.

S401. The access network device sends the RRC release message to the terminal device.

Correspondingly, the terminal device receives the RRC release message from the access network device. The RRC release message includes the measurement configuration information.

S402. The terminal device performs the logged MDT measurement for the target frequency.

S403. The terminal device sends a measurement report to the access network device.

Correspondingly, the access network device receives the measurement report from the terminal device.

Specifically, the access network device sends the RRC release message to the terminal device, where the RRC release message includes information used to indicate the terminal device to perform the logged MDT measurement for the target frequency. The access network device performs a related configuration of the logged MDT measurement by using the RRC release message so that the terminal device performs the logged MDT measurement in RRC idle mode or inactive mode. Correspondingly, the terminal device performs the logged MDT measurement in RRC idle mode or inactive mode based on the measurement configuration information included in the RRC release message to obtain the measurement report, and sends the measurement report to the access network device after switching from RRC idle mode or inactive mode to RRC connected mode.

Optionally, the access network device indicates, by using the RRC release message, the target frequency for which early measurement or idle mode measurement is performed by the terminal device so that when performing the logged MDT measurement, the terminal device logs a measurement result of the target frequency during the early measurement or the idle mode measurement. The early measurement or the idle mode measurement means that in an MR-DC scenario, a first access network device indicates the terminal device, in RRC idle mode or inactive mode, to measure a second access network device so that the first access network device learns of a measurement result of a corresponding cell or an SSB in the second access network device in advance to determine whether to use the second access network device as a secondary access network device in the MR-DC. For the RRC release message, the RRC release message includes at least one frequency. Based on this, in this embodiment of this application, an indication identifier, that is, the measurement configuration information, is added to the RRC release message for the frequency for which the logged MDT measurement needs to be performed. Optionally, the measurement configuration information may include information of the target frequency in the following manners:

Manner 1: Corresponding to a frequency, if there is the measurement configuration information, it indicates that the terminal device needs to perform the logged MDT measurement for the frequency. For example, if the logged MDT measurement needs to be performed for a frequency B20, the measurement configuration information is added to the frequency B20. For example, logged MDT measurement indication information is added to the frequency B20.

Manner 2: First information corresponding to a frequency is used to indicate whether the terminal device performs the logged MDT measurement for the frequency, and the frequency includes the target frequency. Optionally, the first information is in a one-to-one correspondence with the frequency.

For example, the first information is added to all frequencies, and whether the logged MDT measurement needs to be performed is determined based on a difference in the first information. For example, if the first information corresponding to the frequency is 1, the logged MDT measurement needs to be performed for the frequency; or if the first information corresponding to the frequency is 0, the logged MDT measurement does not need to be performed for the frequency. For another example, if the first information corresponding to the frequency is 1, the logged MDT measurement does not need to be performed for the frequency; or if the first information corresponding to the frequency is 0, the logged MDT measurement needs to be performed for the frequency. For still another example, if the first information corresponding to the frequency is on, the logged MDT measurement needs to be performed for the frequency; or if the first information corresponding to the frequency is off, the logged MDT measurement does not need to be performed for the frequency. Alternatively, if the first information corresponding to the frequency is off, the logged MDT measurement needs to be performed for the frequency; or if the first information corresponding to the frequency is on, the logged MDT measurement does not need to be performed for the frequency. For still another example, if the first information corresponding to the frequency is true, the logged MDT measurement needs to be performed for the frequency; or if the first information corresponding to the frequency is false, the logged MDT measurement does not need to be performed for the frequency. Alternatively, if the first information corresponding to the frequency is false, the logged MDT measurement needs to be performed for the frequency; or if the first information corresponding to the frequency is true, the logged MDT measurement does not need to be performed for the frequency.

Manner 3: Second information including M bits is included, where the M bits respectively correspond to M frequencies, a bit value is used to indicate whether the terminal device performs the logged MDT measurement for a frequency, and the frequency includes the target frequency. Optionally, the bits in the second information are in a one-to-one correspondence with the frequencies.

For example, the second information may be represented by using a bitmap, and the bitmap includes the M bits. In this manner, each bit in the bitmap corresponds to one frequency. For example, if the bit value is set to 1, the logged MDT measurement needs to be performed for a frequency corresponding to the bit, or if the bit value is set to 0, the logged MDT measurement does not need to be performed for a frequency corresponding to the bit, and vice versa.

In another implementation, that a terminal device obtains measurement configuration information in S201 may include: The terminal device receives a broadcast message from the access network device, where the broadcast message includes the measurement configuration information.

Figure 5:
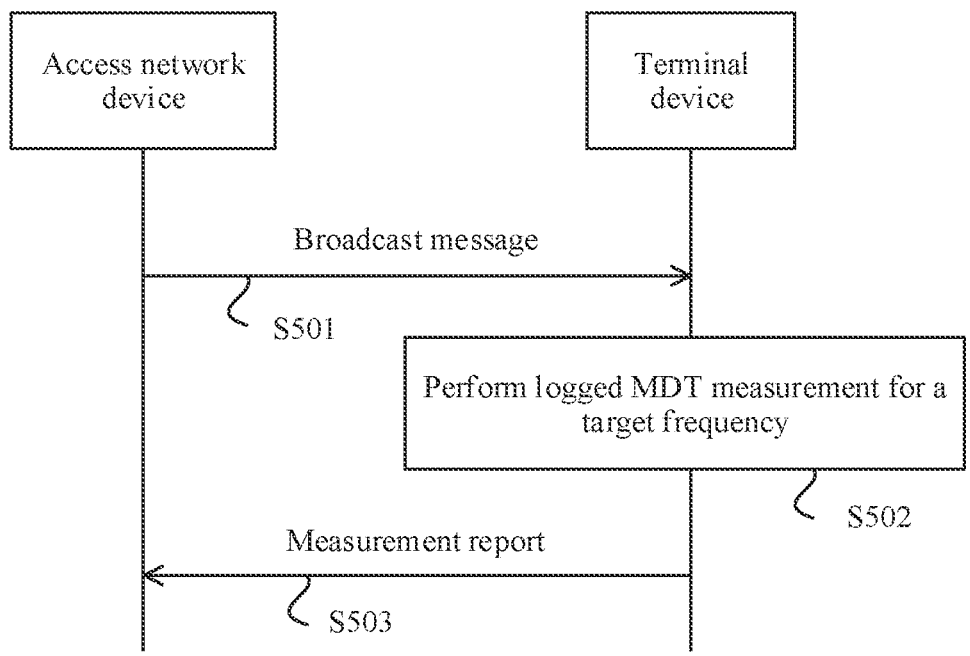
FIG. 5 is a signaling diagram of a communication method according to still another embodiment of this application.

In this implementation, as shown in FIG. 5, the communication method may include the following steps.

S501. The access network device sends the broadcast message to the terminal device.

Correspondingly, the terminal device receives the broadcast message from the access network device.

S502. The terminal device performs the logged MDT measurement for the target frequency.

S503. The terminal device sends a measurement report to the access network device.

Correspondingly, the access network device receives the measurement report from the terminal device.

Specifically, the access network device sends the broadcast message to the terminal device, where the broadcast message includes information used to indicate the terminal device to perform the logged MDT measurement for the target frequency. The access network device performs a related configuration of the logged MDT measurement by using the broadcast message so that the terminal device performs the logged MDT measurement in RRC idle mode or inactive mode. Correspondingly, the terminal device performs the logged MDT measurement in RRC idle mode or inactive mode based on the measurement configuration information included in the broadcast message, to obtain the measurement report, and sends the measurement report to the access network device after switching from RRC idle mode or inactive mode to RRC connected mode.

Optionally, the broadcast message may include at least one of the following messages: a SIB 2, a SIB 3, a SIB 4, or a SIB 5. The SIB 2 includes cell re-selection information used for intra-frequency, inter-frequency, and/or inter-RAT cell re-selection, and intra-frequency cell re-selection information other than a neighboring cell. The SIB 3 includes information that is related to a neighboring cell and that is used only for intra-frequency cell re-selection. The SIB 4 includes information used only for inter-frequency cell re-selection. The SIB 5 includes information used only for inter-RAT cell re-selection. It should be noted that the SIB 2, SIB 3, SIB 4, and SIB 5 are merely used as specific examples of the broadcast message, and an existence form of the broadcast message is not limited in this embodiment of this application. In other words, in addition to the SIB 2, SIB 3, SIB 4, and SIB 5, another broadcast message may also include information used to indicate the terminal device to perform the logged MDT measurement for the target frequency.

Optionally, the access network device indicates, by using the broadcast message, the target frequency for which early measurement or idle mode measurement is performed by the terminal device so that when performing the logged MDT measurement, the terminal device logs a measurement result of the target frequency during the early measurement or the idle mode measurement. The early measurement or the idle mode measurement means that in an MR-DC scenario, a first access network device indicates the terminal device, in RRC idle mode or inactive mode, to measure a second access network device so that the first access network device learns of a measurement result of a corresponding cell or an SSB in the second access network device in advance to determine whether to use the second access network device as a secondary access network device in the MR-DC.

For the broadcast message, the broadcast message includes at least one frequency. Based on this, in this embodiment of this application, an indication identifier, that is, the measurement configuration information, is added to the broadcast message for the frequency for which the logged MDT measurement needs to be performed. Optionally, a specific manner in which the measurement configuration information includes the information of the target frequency is described above. Details are not described herein again.

Further, in 5G deployment, the access network device has a multi-standard feature. For example, an access network device that supports NR may access an EPC (in this case, the access network device may be referred to as an en-gNB), or may access a 5GC (in this case, the access network device may be referred to as a gNB); and an access network device that supports E-UTRA may access an EPC (in this case, the access network device may be referred to as an eNB), or may access a 5GC (in this case, the access network device may be referred to as an ng-eNB). Therefore, in some embodiments, the measurement configuration information may be further used to indicate a target network type for which the logged MDT measurement is performed by the terminal device. Correspondingly, that the terminal device performs the logged MDT measurement for the target frequency may include: The terminal device performs the logged MDT measurement for the target network type corresponding to the target frequency. In other words, if the measurement configuration information further indicates the target network type corresponding to the target frequency for which the logged MDT measurement is performed by the terminal device, the terminal device performs the logged MDT measurement for the target network type corresponding to the target frequency, and specifies the network type for which the logged MDT measurement needs to be performed, to reduce energy consumption of the terminal device. Further, the terminal device reports a measurement result obtained after the logged MDT measurement is performed for the specific network type so that air interface signaling overheads of the terminal device can be further reduced.

The target network type is used to indicate a core network connected to the target frequency, and may include at least one of the following: a 5G core network (5GC) or a 4G core network (EPC).

A logged measurement configuration message further includes the target network type corresponding to the target frequency, and is used to indicate the terminal device to perform the logged MDT measurement for the target frequency corresponding to the target network type. For example, the logged measurement configuration message includes the target frequency B20, and further includes the target network type 5GC corresponding to the frequency B20. In this case, the terminal device performs the logged MDT measurement when the frequency B20 is used and the terminal device accesses only the 5GC.

Similar to the related descriptions in which the indication identifier is added to the foregoing RRC release message for the frequency for which the logged MDT measurement needs to be performed, optionally, the measurement configuration information may further include information of the target network type in the following manners.

Manner 1: Corresponding to a network type, if there is the measurement configuration information, it indicates that the terminal device needs to perform the logged MDT measurement for the network type. That is, if the logged MDT measurement needs to be performed for a network type, the measurement configuration information is added to the network type for which the logged MDT measurement needs to be performed. For example, if the logged MDT measurement needs to be performed for a frequency B20 for accessing the 5GC, the measurement configuration information is added to the frequency B20 for accessing the 5GC.

Manner 2: Third information corresponding to a network type is used to indicate whether the terminal device performs the logged MDT measurement for the network type, and the network type includes the target network type. Optionally, the third information is in a one-to-one correspondence with the network type.

For example, the third information is added to all network types, and whether the logged MDT measurement needs to be performed is determined based on a difference between the third information. For example, if the third information corresponding to the network type is 1, the logged MDT measurement needs to be performed for the network type; or if the third information corresponding to the network type is 0, the logged MDT measurement does not need to be performed for the network type. For another example, if the third information corresponding to the network type is 1, the logged MDT measurement does not need to be performed for the network type; or if the third information corresponding to the network type is 0, the logged MDT measurement needs to be performed for the network type. For still another example, if the third information corresponding to the network type is on, the logged MDT measurement needs to be performed for the network type; or if the third information corresponding to the network type is off, the logged MDT measurement does not need to be performed for the network type. Alternatively, if the third information corresponding to the network type is off, the logged MDT measurement needs to be performed for the network type; or if the third information corresponding to the network type is on, the logged MDT measurement does not need to be performed for the network type. For still another example, if the third information corresponding to the network type is true, the logged MDT measurement needs to be performed for the network type; or if the third information corresponding to the network type is false, the logged MDT measurement does not need to be performed for the network type. Alternatively, if the third information corresponding to the network type is false, the logged MDT measurement needs to be performed for the network type; or if the third information corresponding to the network type is true, the logged MDT measurement does not need to be performed for the network type.

Manner 3: Fourth information including N bits is included, where the N bits respectively correspond to N network types, a bit value is used to indicate whether the terminal device performs the logged MDT measurement for a network type, and the network type includes the target network type. Optionally, the bits in the fourth information are in a one-to-one correspondence with the network types.

For example, the fourth information may be represented by using a bitmap, and the bitmap includes the N bits. In this manner, each bit in the bitmap corresponds to one network type. For example, if the bit value is set to 1, the logged MDT measurement needs to be performed for a network type corresponding to the bit; or if the bit value is set to 0, the logged MDT measurement does not need to be performed for a network type corresponding to the bit.

It should be noted that, for the foregoing three manners in which the measurement configuration information includes the information of the target network type, on the basis of the embodiment shown in FIG. 2, the third information is specifically used to indicate whether the terminal device performs the logged MDT measurement for the network type corresponding to the target frequency, and the bit value in the fourth information is specifically used to indicate whether the terminal device performs the logged MDT measurement for the network type corresponding to the target frequency.

Optionally, if the logged MDT measurement needs to be performed for a network type, a network type indication, that is, the measurement configuration information, is added to a frequency for which the logged MDT measurement needs to be performed.

Figure 6:
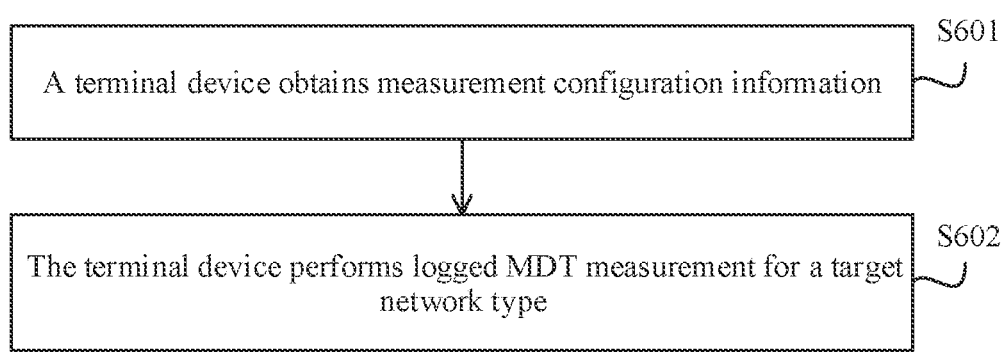
FIG. 6 is a schematic flowchart of a communication method according to another embodiment of this application.

The foregoing embodiment is described from a perspective of the target frequency. Optionally, the embodiments of this application may alternatively be described from a perspective of the target network type. Details are as follows:

FIG. 6 is a schematic flowchart of a communication method according to another embodiment of this application. This embodiment of this application provides a communication method. The communication method may be performed by a communications apparatus, and the communications apparatus may be implemented by using software and/or hardware. For example, the communications apparatus may be integrated into a terminal device, or the communications apparatus is a terminal device.

As shown in FIG. 6, the communication method includes the following steps.

S601. A terminal device obtains measurement configuration information.

The measurement configuration information is used to indicate a target network type for which logged MDT measurement is performed by the terminal device. The measurement configuration information is from an access network device to the terminal device.

Optionally, the target network type is used to indicate a core network connected to a cell or a core network in which a cell is located and to which an access network device is connected, and may include at least one of the following: a 5G core network (5GC), a 4G core network (EPC), or the like.

S602. The terminal device performs the logged MDT measurement for the target network type.

The measurement process occurs when the terminal device is in RRC idle mode or inactive mode.

For example, the terminal device performs the logged MDT measurement for the target network type. It may be understood that, in an LTE system, a cell corresponds to an ECGI, and different cells may be distinguished between by using ECGIs. Considering that the access network device has a multi-standard feature in 5G deployment, in an NR system, the cell corresponds to a new radio cell global identifier (NCGI). When the access network device accesses both the 5GC core network and the EPC core network, the measurement configuration information in this embodiment of this application is used to indicate the target network type for which the logged MDT measurement is performed by the terminal device so that the logged MDT measurement is performed for the target network type. For example, an access network device that supports NR may access an EPC core network (in this case, the access network device is referred to as an en-gNB), or may access a 5GC core network (in this case, the access network device is referred to as a gNB); and an access network device that supports E-UTRA may access an EPC core network (in this case, the access network device is referred to as an eNB), or may access a 5GC core network (in this case, the access network device is referred to as an ng-eNB). If the measurement configuration information indicates that the target network type used by the terminal device to perform the logged MDT measurement for the access network device that supports NR is the 5GC core network, the terminal device performs logged MDT measurement for a cell or an SSB in the gNB, and does not perform logged MDT measurement for another network type, thereby reducing energy consumption overheads of the terminal device.

In this embodiment, the terminal device obtains the measurement configuration information, where the measurement configuration information is used to indicate the target network type for which the logged MDT measurement is performed by the terminal device; and the terminal device performs the logged MDT measurement for the target network type. The logged MDT measurement is performed for the target network type by the terminal device in a targeted manner so that network quality can be evaluated in a 5G communications system or a future communications system. Further, the logged MDT measurement is performed only for the target network type and logged MDT measurement does not need to be performed for another network type so that the energy consumption overheads of the terminal device can be reduced.

Further, after the terminal device performs the logged MDT measurement for the target network type, the terminal device may send a measurement report to the access network device. The measurement report includes logged MDT measurement information of the target network type. The measurement report is reported when the terminal device switches from RRC idle mode or inactive mode to RRC connected mode. The measurement report including the logged MDT measurement information of the target network type is sent to the access network device, and a measurement report including logged MDT measurement information of another network type does not need to be transmitted. Because a data volume of the measurement report is relatively small, energy consumption of the terminal device and air interface signaling overheads can be further reduced.

On the basis of the foregoing embodiment, in an implementation, that a terminal device obtains measurement configuration information in S601 may include: The terminal device receives a logged measurement configuration message from the access network device, where the logged measurement configuration message includes the measurement configuration information. Alternatively, in another implementation, that a terminal device obtains measurement configuration information in S601 may include: The terminal device receives an RRC release message from the access network device, where the RRC release message includes the measurement configuration information. Alternatively, in still another implementation, that a terminal device obtains measurement configuration information in S601 may include: The terminal device receives a broadcast message from the access network device, where the broadcast message includes the measurement configuration information. For specific implementation of the three implementations, refer to the foregoing embodiment shown in FIG. 3, FIG. 4, or FIG. 5. Details are not described herein again.

Further, the measurement configuration information in this embodiment may be further used to indicate a target frequency for which the logged MDT measurement is performed by the terminal device. Correspondingly, that the terminal device performs the logged MDT measurement for the target network type may include: The terminal device performs the logged MDT measurement for the target frequency corresponding to the target network type. Related descriptions of this embodiment are similar to those of the foregoing embodiments. Details are not described herein again.

It should be noted that, on the basis of the embodiment shown in FIG. 6, for the foregoing three manners in which the measurement configuration information includes the information of the target frequency, first information is specifically used to indicate whether the terminal device performs logged MDT measurement for a target frequency corresponding to the target network type, and a bit value in second information is specifically used to indicate whether the terminal device performs logged MDT measurement for a target frequency corresponding to the target network type.

It can be learned from the foregoing embodiments that the measurement configuration information may be used only to indicate the target frequency for which the logged MDT measurement is performed by the terminal device; or the measurement configuration information may be used only to indicate the target network type for which the logged MDT measurement is performed by the terminal device; or the measurement configuration information may be used to indicate both a target frequency and a target network type for which the logged MDT measurement is performed by the terminal device. For specific interaction between the terminal device and the access network device in each scenario, refer to the foregoing embodiments.

In this embodiment of this application, the access network device indicates the target frequency and/or the target network type for which the logged MDT measurement needs to be performed by the terminal device so that the terminal device is prevented from performing the logged MDT measurement for all frequencies and/or network types, thereby reducing energy consumption of the terminal device and air interface signaling overheads.

Figure 7:
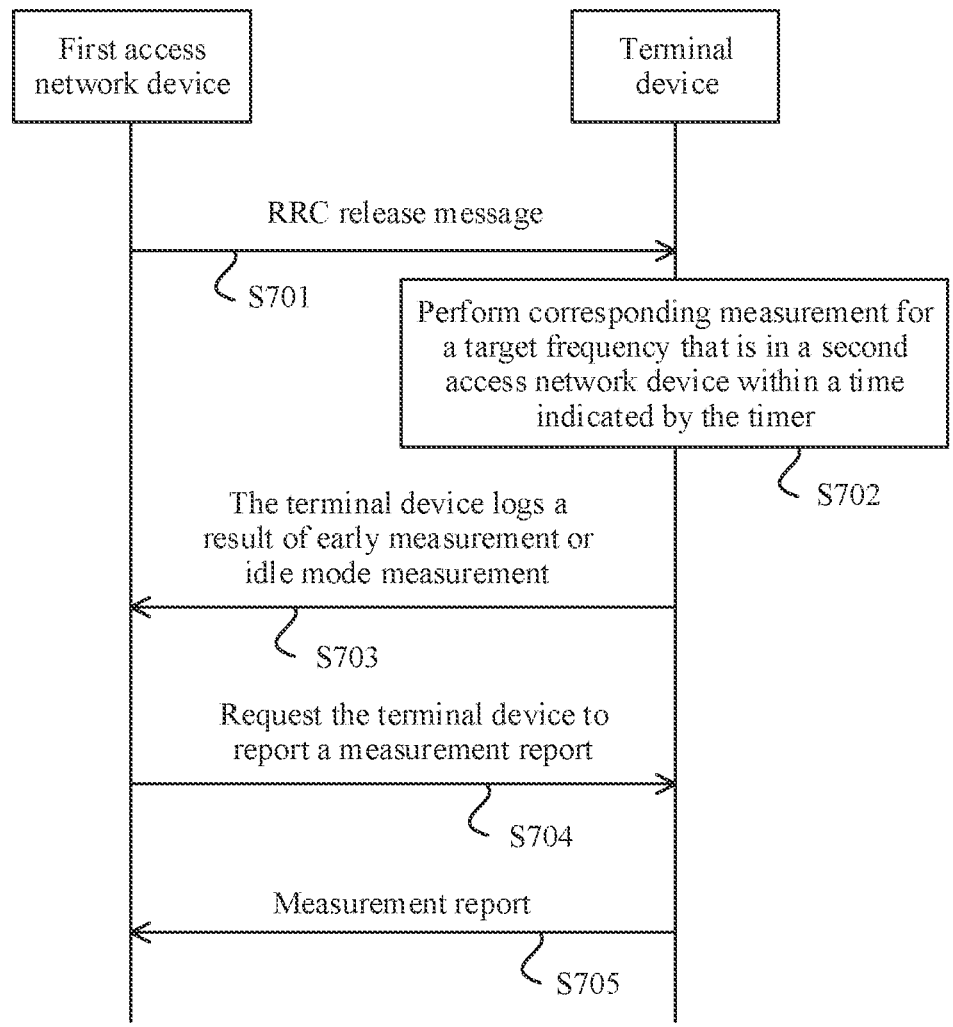
FIG. 7 is a signaling diagram of a communication method according to still another embodiment of this application.

In another implementation, as shown in FIG. 7, the communication method may include the following steps.

S701. A first access network device sends an RRC release message to the terminal device.

The RRC release message includes information used to indicate a target frequency for which measurement is performed by the terminal device and a timer corresponding to the measurement.

Optionally, the target frequency is used to indicate information for the terminal device to perform the logged MDT measurement for the target frequency. In this embodiment, the target frequency is a frequency of a second access network device in an MR-DC scenario.

Optionally, the timer is used to indicate an effective time range of the measurement, that is, a start time and an end time of the measurement.

Optionally, the timer is used to indicate the end time of the measurement, for example, T331. The start time of the measurement is a time at which the terminal device receives the RRC release message from the first access network device. In other words, the terminal device starts the timer when receiving the RRC release message from the first access network device.

Optionally, the target frequency is used to indicate a target frequency for which the early measurement or the idle mode measurement is performed by the terminal device. The timer may also be used to indicate a time (including the start time and the end time of the measurement) within which the early measurement or the idle mode measurement is performed or an end time.

Optionally, the target frequency may be further used to indicate the information for the terminal device to perform the logged MDT measurement for the target frequency and indicate the target frequency for which the early measurement or the idle mode measurement is performed by the terminal device. The timer may be further used to indicate a time (including a start time and an end time of the measurement) within which the logged MDT measurement is performed or an end time, and used to indicate a time (including a start time and an end time of the measurement) within which the early measurement or the idle mode measurement is performed or an end time.

Optionally, the RRC release message further includes a priority of the target frequency, and the priority is used to indicate the terminal device to preferentially measure a target frequency with a high priority.

Correspondingly, the terminal device receives the RRC release message from the access network device.

S702. The terminal device performs corresponding measurement for the target frequency that is in the second access network device within a time indicated by the timer.

For example, if the measurement timer is T331, the terminal device starts early measurement or idle mode measurement when receiving the RRC release message, and, at the same time, the terminal device performs logged MDT measurement logging (for example, the terminal device periodically performs logging), and logs related location information and time information of the terminal device.

S703. When the terminal device switches from RRC idle mode or inactive mode to RRC connected mode, the terminal device indicates to the first access network device, that the terminal device logs a result of the early measurement or the idle mode measurement.

For example, an RRC setup complete message or an RRC resume complete message from the terminal device to the access network device includes indication information used to indicate that the terminal device logs the result of the early measurement or the idle mode measurement. Optionally, for the measurement result corresponding to the early measurement or the idle mode measurement, the measurement result may include a time at which the terminal device obtains these measurement results. Optionally, the terminal device may further include a logged MDT measurement indication corresponding to the result of the early measurement or the idle mode measurement.

S704. The first access network device requests the terminal device to report a measurement report.

The measurement report includes measurement information of the target frequency.

S705. The terminal device sends the measurement report to the first access network device.

Correspondingly, the first access network device receives the measurement report from the terminal device.

Specifically, the terminal device reports a logged MDT measurement report corresponding to the early measurement or the idle mode measurement.

In this embodiment of this application, the logged MDT measurement is performed when the early measurement or the idle mode measurement is performed so that in the MR-DC scenario, the terminal device can periodically log a measurement report obtained in a process of the early measurement or the idle mode measurement, thereby reducing complexity of the terminal device. For example, in the MR-DC scenario in which a secondary access network device cannot camp on a terminal device in idle mode, a terminal device measures, only in the early measurement or the idle mode measurement, signal quality of a cell in a communications standard corresponding to the secondary access network device. In this embodiment of this application, the logged MDT measurement is performed when the early measurement or the idle mode measurement is performed so that logged signal quality of the cell in the communications standard corresponding to the secondary access network device can be simultaneously reached with limited complexity.

Figure 8:
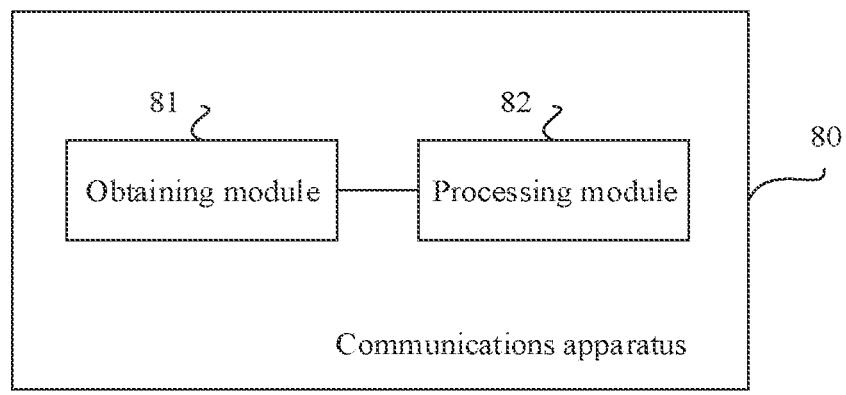
FIG. 8 is a schematic structural diagram of a communications apparatus according to an embodiment of this application.

FIG. 8 is a schematic structural diagram of a communications apparatus according to an embodiment of this application. The communications apparatus may be a terminal device, or may be a chip that can be used in a terminal device. As shown in FIG. 8, the communications apparatus 80 in this embodiment includes an obtaining module 81 and a processing module 82.

In an implementation, the obtaining module 81 is configured to obtain measurement configuration information, where the measurement configuration information is used to indicate a target frequency for which logged MDT measurement is performed by the terminal device. The processing module 82 is configured to perform the logged MDT measurement for the target frequency.

Optionally, the measurement configuration information may be further used to indicate a target network type for which the logged MDT measurement is performed by the terminal device. Correspondingly, the processing module 82 may be specifically configured to perform the logged MDT measurement for the target network type corresponding to the target frequency.

In another implementation, the obtaining module 81 is configured to obtain measurement configuration information, where the measurement configuration information is used to indicate a target network type for which logged MDT measurement is performed by the terminal device. The processing module 82 is configured to perform the logged MDT measurement for the target network type.

Optionally, the measurement configuration information may be further used to indicate a target frequency for which the logged MDT measurement is performed by the terminal device. Correspondingly, the processing module 82 may be specifically configured to perform the logged MDT measurement for the target frequency corresponding to the target network type.

Further, the communications apparatus 80 may further include a sending module (not shown). The sending module is configured to: after the processing module 82 performs the logged MDT measurement for the target frequency or the target network type, send a measurement report to an access network device, where the measurement report includes logged MDT measurement information of the target frequency or the target network type.

The communications apparatus in this embodiment may be configured to perform the technical solutions performed by the terminal device or the chip in the terminal device in each of the foregoing corresponding method embodiments. Implementation principles and technical effects of the communications apparatus are similar to those in the foregoing method embodiments. For functions of modules, refer to corresponding descriptions in the method embodiments. Details are not described herein again.

In some embodiments, in hardware implementation, the obtaining module 81, the processing module 82, and the sending module may be embedded in a processor in a hardware form. Alternatively, in hardware implementation, the obtaining module 81 may be a receiver, the processing module 82 may be a processor, and the sending module may be a transmitter, where the receiver and the transmitter may be integrated into a transceiver.

Correspondingly, the communications apparatus in this embodiment may further include a memory, and the memory is configured to store a computer program that can be executed by the processor. When the processor reads and executes the computer program, the processor is enabled to perform the communication method described above.

The computer program may be implemented in a form of a software functional unit and can be sold or used as an independent product. The memory may be a computer-readable storage medium in any form. Based on such an understanding, all or some of the technical solutions of this application may be implemented in a form of a software product including several instructions to enable a computer device that may be specifically the processor to perform all or some of the steps of the terminal device in the embodiments of this application. In addition, the computer-readable storage medium includes various media that can store program code, such as a USB flash drive, a removable hard disk, a read-only memory (ROM), a random access memory (RAM), a magnetic disk, or an optical disk.

Figure 9:
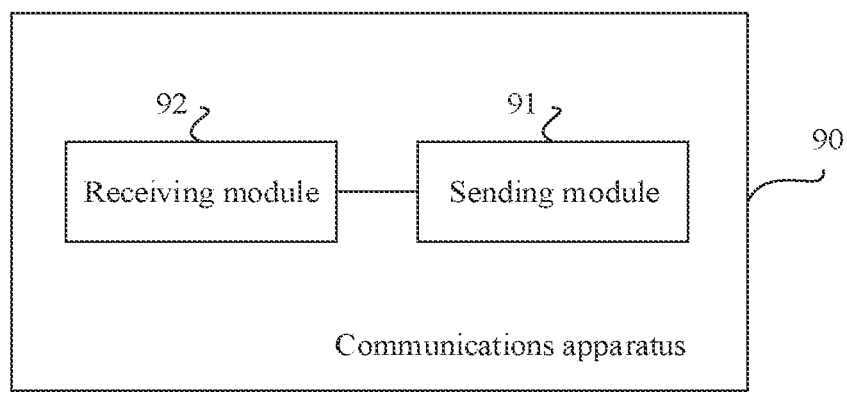
FIG. 9 is a schematic structural diagram of a communications apparatus according to another embodiment of this application.

FIG. 9 is a schematic structural diagram of a communications apparatus according to another embodiment of this application. The communications apparatus may be an access network device, or may be a chip that can be used in an access network device. As shown in FIG. 9, the communications apparatus 90 in this embodiment includes a sending module 91 and a receiving module 92. Herein, In an implementation, the sending module 91 is configured to send measurement configuration information to a terminal device, where the measurement configuration information is used to indicate a target frequency for which logged MDT measurement is performed by the terminal device. The receiving module 92 is configured to receive a measurement report from the terminal device, where the measurement result includes logged MDT measurement information of the target frequency.

Optionally, the measurement configuration information may be further used to indicate a target network type for which the logged MDT measurement is performed by the terminal device. Correspondingly, the measurement report includes logged MDT measurement information of the target network type corresponding to the target frequency.

In another implementation, the sending module 91 is configured to send measurement configuration information to a terminal device, where the measurement configuration information is used to indicate a target network type for which logged MDT measurement is performed by the terminal device. The receiving module 92 is configured to receive a measurement report from the terminal device, where the measurement report includes logged MDT measurement information of the target network type.

Optionally, the measurement configuration information may be further used to indicate a target frequency for which the logged MDT measurement is performed by the terminal device. Correspondingly, the measurement report includes logged MDT measurement information of the target frequency corresponding to the target network type.

The communications apparatus in this embodiment may be configured to perform the technical solutions performed by the access network device or the chip in the access network device in each of the foregoing corresponding method embodiments. Implementation principles and technical effects of the communications apparatus are similar to those in the foregoing method embodiments. For functions of modules, refer to corresponding descriptions in the method embodiments. Details are not described herein again.

In some embodiments, in hardware implementation, the sending module 91 and the receiving module 92 may be embedded in a processor in a hardware form. Alternatively, in hardware implementation, the sending module 91 may be a transmitter, and the receiving module 92 may be a receiver, where the receiver and the transmitter may be integrated into a transceiver.

Correspondingly, the communications apparatus in this embodiment may further include a memory, and the memory is configured to store a computer program that can be executed by the processor. When the processor reads and executes the computer program, the processor is enabled to perform the communication method described above.

The computer program may be implemented in a form of a software functional unit and can be sold or used as an independent product. The memory may be a computer-readable storage medium in any form. Based on such an understanding, all or some of the technical solutions of this application may be implemented in a form of a software product including several instructions to enable a computer device that may be specifically the processor to perform all or some of the steps of the access network device in the embodiments of this application. In addition, the computer-readable storage medium includes various media that can store program code, such as a USB flash drive, a removable hard disk, a read-only memory (ROM), a random access memory (RAM), a magnetic disk, or an optical disk.

Further, on the basis of any one of the embodiments of this application:

The measurement configuration information may include first information corresponding to a frequency, and the first information is used to indicate whether the terminal device performs the logged MDT measurement for the frequency, and the frequency herein includes the target frequency. Optionally, the first information is in a one-to-one correspondence with the frequency.

Alternatively, the measurement configuration information may include second information including M bits, the M bits respectively correspond to M frequencies, a bit value is used to indicate whether the terminal device performs the logged MDT measurement for a frequency, and the frequency herein includes the target frequency. Optionally, the bits in the second information are in a one-to-one correspondence with the frequencies.

In addition, the measurement configuration information may further include third information corresponding to a network type, and the third information used to indicate whether the terminal device performs the logged MDT measurement for the network type, where the network type includes the target network type. Alternatively, the measurement configuration information includes fourth information including N bits, where the N bits respectively correspond to N network types, a bit value is used to indicate whether the terminal device performs the logged MDT measurement for the network type, and the network type includes the target network type. Optionally, the third information is in a one-to-one correspondence with the network type, or the bits in the fourth information are in a one-to-one correspondence with the network types.

Further, on the basis of the embodiment shown in FIG. 2, the third information is specifically used to indicate whether the terminal device performs the logged MDT measurement for the network type corresponding to the target frequency, and the bit value in the fourth information is specifically used to indicate whether the terminal device performs the logged MDT measurement for the network type corresponding to the target frequency. In addition, the target network type is used to indicate a core network connected to the target frequency, and includes at least one of the following: a 5G core network 5GC or a 4G core network EPC, or the like.

Further, on the basis of the embodiment shown in FIG. 6, the first information is specifically used to indicate whether the terminal device performs the logged MDT measurement for the frequency corresponding to the target network type, and the bit value in the second information is specifically used to indicate whether the terminal device performs the logged MDT measurement for the frequency corresponding to the target network type. The target network type may be used to indicate a core network connected to a cell or a core network in which a cell is located and to which a network device is connected, and includes at least one of the following: a 5G core network 5GC, a 4G core network EPC, or the like.

Figure 10:
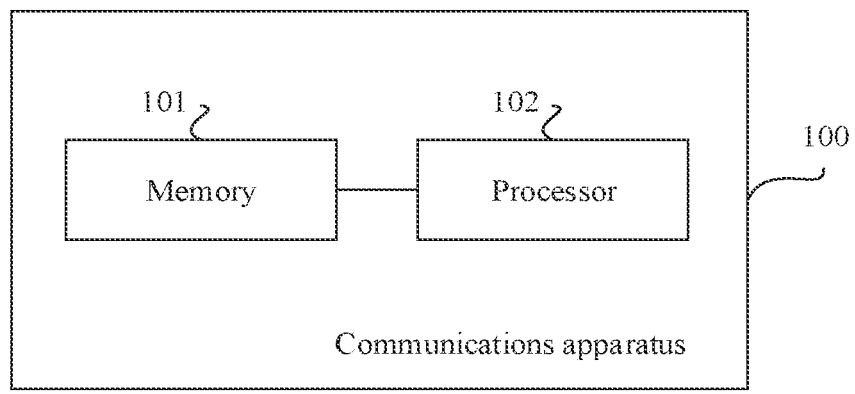
FIG. 10 is a schematic structural diagram of a communications apparatus according to still another embodiment of this application.

FIG. 10 is a schematic structural diagram of a communications apparatus according to still another embodiment of this application. As shown in FIG. 10, the communications apparatus 100 includes a memory 101 and a processor 102. The memory 101 stores a computer program that can be executed by the processor 102. When the processor 102 reads and executes the computer program, the communications apparatus 100 is enabled to perform the method according to any one of the foregoing embodiments.

For example, when the communications apparatus 100 is a terminal device or a chip that can be used in a terminal device, when the processor 102 reads and executes the computer program, the communications apparatus 100 is enabled to perform the steps performed by the terminal device in the method according to any one of the foregoing embodiments. When the communications apparatus 100 is an access network device or a chip that can be used in an access network device, when the processor 102 reads and executes the computer program, the communications apparatus 100 is enabled to perform the steps performed by the access network device in the method according to any one of the foregoing embodiments.

It should be noted that, in the embodiments of this application, division into the modules is an example, and is merely logical function division. During actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, or an access network device) or a processor to perform all or some of the steps of the methods in the embodiments of this application. The storage medium includes any medium that can store program code, for example, a USB flash drive, a removable hard disk, a ROM, a RAM, a magnetic disk, or an optical disc.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A communication method applied to a terminal device, comprising:
   obtaining measurement configuration information, wherein the measurement configuration information comprises frequency information that indicates one or more target downlink frequencies on which logged minimization of drive tests (logged MDT) measurement is performed by a terminal device, and wherein the one or more target downlink frequencies comprises at least one measurement frequency on which early measurement is performed by the terminal device; and performing measurement logging, wherein the measurement logging comprises logging a result of the early measurement performed on the at least one measurement frequency into a result of the logged MDT measurement.

2. The method according to claim 1, wherein the obtaining measurement configuration information comprises:
receiving a logged measurement configuration message from an access network device, wherein the logged measurement configuration message comprises the measurement configuration information.

3. The method according to claim 2, wherein after the measurement logging, the method further comprises:
sending a measurement report to the access network device, wherein the measurement report comprises logged MDT measurement information of the one or more target downlink frequencies, wherein the logged MDT measurement information comprises the result of the logged MDT measurement.

4. The method according to claim 3, wherein the sending a measurement report to the access network device comprises:
sending the measurement report to the access network device when the terminal device is in radio resource control (RRC) connected mode.

5. The method according to claim 1, the method further comprise:
performing the logged MDT measurement for a cell based on the one or more target downlink frequencies.

6. The method according to claim 1, wherein the frequency information comprises one or more absolute radio frequency channel numbers (ARFCNs) that indicate the one or more target downlink frequencies.

7. The method according to claim 1, wherein the performing measurement logging comprises:
performing the measurement logging when the terminal device is in radio resource control (RRC) idle mode.

8. The method according to claim 1, wherein the performing measurement logging comprises:
performing the logged MDT measurement when the terminal device is in radio resource control (RRC) inactive mode.

9. A communication method, comprising:
sending, by an access network device, measurement configuration information to a terminal device, wherein the measurement configuration information comprises frequency information that indicates one or more target downlink frequencies only on which logged minimization of drive tests (logged MDT) measurement is performed by the terminal device, and wherein the one or more target downlink frequencies comprises at least one measurement frequency on which early measurement is performed by the terminal device; and
receiving, by the access network device, a measurement report from the terminal device, wherein the measurement report comprises logged MDT measurement information of the one or more target downlink frequencies, wherein the logged MDT measurement information comprises a result of the early measurement performed on the at least one measurement frequency.

10. The method according to claim 9, wherein the sending, by an access network device, measurement configuration information to a terminal device comprises:
sending, by the access network device, a radio resource control (RRC) release message to the terminal device, wherein the RRC release message comprises the measurement configuration information.

11. The method according to claim 10, wherein:
the RRC release message further comprises a timer indicating the terminal device to perform the logged MDT measurement; and
the measurement report comprises the logged MDT measurement information of the one or more target downlink frequencies within a time period indicated by the timer.

12. A communications apparatus, comprising:
at least one processor; and
at least one memory coupled to the at least one processor and storing programming instructions for execution by the at least one processor to perform operations comprising:
obtaining measurement configuration information, wherein the measurement configuration information comprises frequency information that indicates one or more target downlink frequencies on which logged minimization of drive tests (logged MDT) measurement is performed by the apparatus, and wherein the one or more target downlink frequencies comprises at least one measurement frequency on which early measurement is performed by the apparatus; and
performing measurement logging, wherein the measurement logging comprises logging a result of the early measurement performed on the at least one measurement frequency into a result of the logged MDT measurement only on the one or more target downlink frequencies indicated by the frequency information.

13. The apparatus according to claim 12, wherein the obtaining measurement configuration information comprises:
receiving a logged measurement configuration message from an access network device, wherein the logged measurement configuration message comprises the measurement configuration information.

14. The apparatus according to claim 13, wherein the operations further comprise:
sending a measurement report to the access network device, wherein the measurement report comprises logged MDT measurement information of the one or more target downlink frequencies after performing the logged MDT measurement, wherein the logged MDT measurement information comprises the result of the logged MDT measurement.

15. The apparatus according to claim 14, wherein the measurement report is sent when the apparatus is in radio resource control (RRC) connected mode.

16. The apparatus according to claim 12, wherein the operations further comprise:
performing the logged MDT measurement for a cell based on the one or more target downlink frequencies.

17. The apparatus according to claim 12, wherein the logged MDT measurement is performed when the apparatus is in radio resource control (RRC) idle mode.

18. The apparatus according to claim 12, wherein the logged MDT measurement is performed when the apparatus is in radio resource control (RRC) inactive mode.

19. A communications apparatus, comprising:
at least one processor; and
at least one memory coupled to the at least one processor and storing programming instructions for execution by the at least one processor to perform operations comprising:
sending measurement configuration information to a terminal device, wherein the measurement configuration information comprises frequency information that indicates one or more target downlink frequencies only on which logged minimization of drive tests (logged MDT) measurement is performed by the terminal device, and wherein the one or more target downlink frequencies comprises at least one measurement frequency on which early measurement is performed by the terminal device; and
receiving a measurement report from the terminal device, wherein the measurement report comprises logged MDT measurement information of the one or more target downlink frequencies wherein the logged MDT measurement information comprises a result of the early measurement performed on the at least one measurement frequency.

20. The method according to claim 1, wherein the early measurement comprises a measurement of a second network access device while the terminal is in in RRC idle mode or inactive mode, and wherein the measurement configuration information is received from a first network access device that is different from the second network access device.

* * * * *

UNITED STATES PATENT AND TRADEMARK OFFICE
CERTIFICATE OF CORRECTION

| | | |
|---|---|---|
| PATENT NO. | : 12,335,755 B2 | Page 1 of 1 |
| APPLICATION NO. | : 17/376790 | |
| DATED | : June 17, 2025 | |
| INVENTOR(S) | : Shuigen Yang et al. | |

It is certified that error appears in the above-identified patent and that said Letters Patent is hereby corrected as shown below:

In the Claims

In Column 32, In Line 36-38, In Claim 12, delete "measurement only on the one or more target downlink frequencies indicated by the frequency information." and insert -- measurement. --.

In Column 33, In Line 20, In Claim 19, after "frequencies" insert -- , --.

In Column 33, In Line 26, In Claim 20, delete "in in" and insert -- in --.

Signed and Sealed this
Thirtieth Day of September, 2025

John A. Squires
*Director of the United States Patent and Trademark Office*